United States Patent [19]

Chen

[11] Patent Number: 4,806,705
[45] Date of Patent: Feb. 21, 1989

[54] HOLDER FOR USE IN CABLE CONDUITS

[75] Inventor: Chung-Fang Chen, Taipei, Taiwan

[73] Assignee: Jack Moon Co., Ltd., Bell Gardens, Calif.

[21] Appl. No.: 88,913

[22] Filed: Aug. 21, 1987

[51] Int. Cl.⁴ .............................................. H02G 1/00
[52] U.S. Cl. .................................... 174/135; 138/108; 248/49
[58] Field of Search ...................... 174/99 R, 111, 135, 174/138 R, 155; 138/105, 106, 108, 113; 248/49; 24/115 M, 136 R, 136 L; 403/368

[56] References Cited

U.S. PATENT DOCUMENTS

| 109,879 | 12/1870 | Montufar | 174/155 |
| 419,277 | 1/1890 | Murray | 138/106 X |
| 4,296,481 | 10/1981 | Weiss | 174/99 R X |

FOREIGN PATENT DOCUMENTS 351460 2/1961 Switzerland ..................... 138/106

Primary Examiner—Laramie E. Askin
Attorney, Agent, or Firm—Nilsson, Robbins, Dalgarn, Berliner, Carson & Wurst

[57] ABSTRACT

A cable holder for use in supporting a single cable within a conduit is formed of a strong, lightweight, arc-shaped element having a substantially planar front surface, a rear surface broken by a cavity extending substantially the thickness of the arc-shaped element, an arcuate concave upper surface and an arcuate convex bottom surface. Both arcuate surfaces constitute approximately 120 degree arcs of circles. A stud is provided on the planar front surface. A rib positioned within the cavity provides support for the front surface at the point where the stud is located.

3 Claims, 1 Drawing Sheet

HOLDER FOR USE IN CABLE CONDUITS

BACKGROUND OF THE INVENTION

This invention relates to a holder for use in cable conduits. In one of its more particular aspects, it relates to a holder which can be used for steadying a cable during installation of a cable conduit plug.

When running a system of power cables, telephone cables or the like from distribution centers to and then into using centers, it is necessary, through at least the latter part of the system, to first install conduits through which cables are subsequently pulled. During the span of time from installation of the conduits until the cables are pulled, the conduits are left open and are thus subject to contamination by rodent debris, moisture, dirt and other contaminants depending upon the location and disposition of the conduits. Once the cables are pulled into conduits, the destructive environmental factors mentioned above adversely affect the cables as well as the conduit. Many attempts have been made in the past to seal the empty conduit until the cables have been disposed therein. In addition, since after the cable has been pulled into position in the conduit there is space left around the cable, attempts have been made to seal this space as well.

In all known previous attempts to seal the empty conduit and the cable-containing conduit, a complete seal has not been effected, and this exposure to adverse environmental factors continues to be a problem.

In addition to plugging the conduit to prevent contamination of the cable, it is also necessary that the cable be held securely in place in the conduit to prevent damage to the cable.

A cable conduit plug satisfying some of the deficiencies of the prior art plugs is described in Taiwan Pat. No. 20195, Underground Electric Cable Conduit Plug.

An improved cable conduit plug specifically designed for multiple cable conduits is described in my co-pending application Ser. No. 57,420, filed June 3, 1987. An improved cable conduit plug for single cable conduits is described in my copending application Ser. No. 66,788, filed June 25, 1987.

In utilizing the above-mentioned cable conduit plugs, it has been found convenient to hold a cable or cables during installation and use by means of a suitable cable holder. A cable holder specifically designed for holding a plurality of cables is described in the above-mentioned copending application Ser. No. 57,420. The present application describes a cable holder designed for holding a single cable.

It is an object of the present invention to provide a convenient cable holder for holding a single cable within a conduit.

Another object of the present invention is to provide a lightweight cable holder which is strong enough to support a relatively heavy cable during installation and use.

Other objects and advantages of the present invention will become apparent from the following detailed disclosure.

SUMMARY OF THE INVENTION

The present invention provides a cable holder in the form of a hollow three-dimensional arc-shaped element equipped with interior reinforcement. In a preferred embodiment, at least one face of the cable holder is substantially planar and may contain a positioning stud.

DESCRIPTION OF THE PREFERRED EMBODIMENTS

Figure 1:
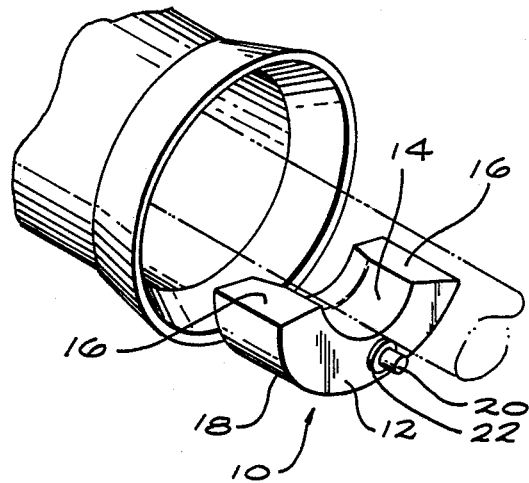
FIG. 1 is a perspective view of a cable holder according to the present invention positioned outside a conduit with a cable shown in phantom.
Figure 2:
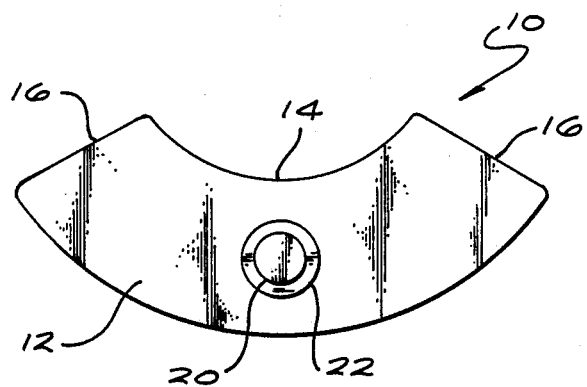
FIG. 2 is a front elevation view of the cable holder shown in FIG. 1.

Referring to FIG. 1, a cable holder 10 is seen to be in the shape of a three-dimensional arc shaped element having a substantially planar front surface 12, an arcuate concave upper surface 14, generally planar surfaces 16 on the top side and an arcuate convex bottom surface 18, both arcuate surfaces constituting approximately 120° arcs of circles. Cable holder 10 also contains a stud 20 and a stud base 22, the purpose of which is to enable positioning of the cable holder with a cable resting thereon within a conduit by pounding upon the stud.

Figure 3:
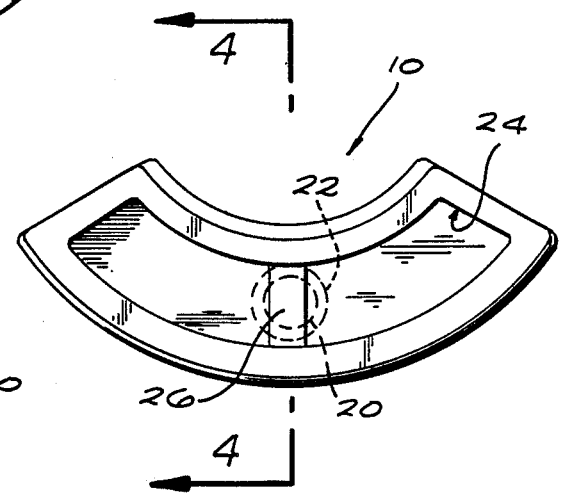
FIG. 3 is a rear elevation view of the cable holder of FIG. 1 with a stud and stud base shown in phantom.
Figure 4:
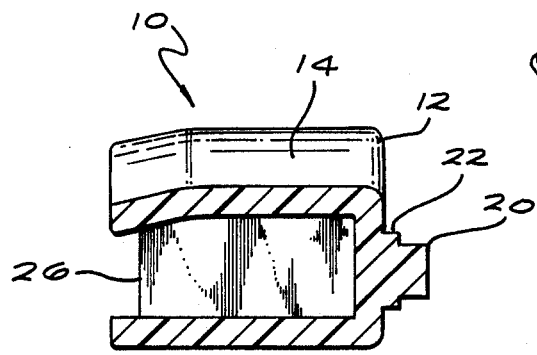
FIG. 4 is a cross-sectional view of the cable holder of FIG. 1 taken along the line 4—4 of FIG. 3.

FIGS. 3 and 4 show a cavity 24 in cable holder 10 as well as reinforcing rib 26 which ensures adequate strength to support a cable upon the cable holder. Cavity 24 may extend substantially all the way from the rear surface to the front surface of the cable holder, as shown in FIG. 4, or to some intermediate depth, thus effectively reducing the weight of the cable holder. Reinforcing rib 26 may extend from the front surface to the rear surface or to some intermediate point within cavity 24, effectively strengthening the cable holder. Also, as shown the most clearly in FIG. 4 but as is also apparent from FIGS. 1 and 3, the upper surface is inclined upwardly from the rear surface to a point between the rear surface and the front surface.

Cable holder 10 can be fabricated of any hard plastic material, aluminum or a light weight alloy.

The foregoing description of the invention has been directed to particular preferred embodiments for purposes of explanation and illustration. It will be apparent, however, to those skilled in the art, that many modifications and changes in the particular methods and materials may be made without departure from the scope and spirit of the invention. For example, the number of reinforcing ribs may be varied. In addition, the arrangement of parts and the substitution of equivalent parts is well within the scope of those skilled in the art. It is applicant's intention in the following claims to cover all such equivalents, modifications and changes that fall within the true spirit and scope of the invention.

What is claimed is:

1. A cable holder for use in supporting a single cable within a conduit which comprises a weight-supporting, lightweight arc-shaped element having a substantially planar front surface, a rear surface broken by a cavity extending substantially the thickness of the arc-shaped element, an arcuate concave upper surface and an arcuate convex bottom surface, both arcuate surfaces constituting approximately 120 degree arcs of circles, a stud being provided on said substantially planar front surface, and said cavity containing a rib which provides support for said substantially planar front surface at the point where the stud is located.

2. A cable holder according to claim 1 wherein said arcuate concave upper surface is inclined upwardly from said rear surface toward said substantially planar front surface.

3. A cable holder according to claim 1 wherein said arcuate concave upper surface is inclined upwardly from said rear surface to a point between said rear surface and said substantially planar front surface.

* * * * *